United States Patent
Ohno

(10) Patent No.: US 7,956,311 B2
(45) Date of Patent: Jun. 7, 2011

(54) SPECTROSCOPIC DEVICE

(75) Inventor: Wataru Ohno, Tokyo (JP)

(73) Assignee: Olympus Corporation, Tokyo (JP)

( * ) Notice: Subject to any disclaimer, the term of this patent is extended or adjusted under 35 U.S.C. 154(b) by 19 days.

(21) Appl. No.: 12/514,871

(22) PCT Filed: Nov. 15, 2007

(86) PCT No.: PCT/JP2007/072152
§ 371 (c)(1),
(2), (4) Date: May 14, 2009

(87) PCT Pub. No.: WO2008/059908
PCT Pub. Date: May 22, 2008

(65) Prior Publication Data
US 2010/0044550 A1    Feb. 25, 2010

(30) Foreign Application Priority Data

Nov. 16, 2006  (JP) .................. 2006-310694

(51) Int. Cl.
- *G01J 1/20* (2006.01)
- *G01J 3/50* (2006.01)
- *G01J 3/42* (2006.01)
- *G01J 3/28* (2006.01)

(52) U.S. Cl. ............ 250/201.1; 250/226; 356/319; 356/326

(58) Field of Classification Search ............ 250/208.1, 250/226, 201.1–201.4, 201.7–201.9, 559.05–559.08, 250/214.1, 216, 227.18, 227.2, 227.23; 359/618, 359/640, 578, 589, 590; 356/301, 317, 318, 356/319, 326, 328, 417, 419
See application file for complete search history.

(56) References Cited

U.S. PATENT DOCUMENTS 5,729,011 A * 3/1998 Sekiguchi ............... 250/226
6,636,357 B2 * 10/2003 Robins et al. ............ 359/579

FOREIGN PATENT DOCUMENTS

| JP | 2771785 | 4/1998 |
| JP | 2001-100118 | 4/2001 |
| JP | 2005-321388 | 11/2005 |
| JP | 2006-177954 | 7/2006 |

* cited by examiner

Primary Examiner — Georgia Y Epps
Assistant Examiner — Don Williams
(74) Attorney, Agent, or Firm — Scully, Scott, Murphy & Presser, P.C.

(57) ABSTRACT

Quantitative comparison or calculation of a plurality of images in different transmission bands is facilitated even if the transmission bandwidth of the spectroscopic element is different at different wavelengths. Provided is a spectroscopic device (1) including: a tunable spectroscopic element that changes the transmission band of light passing through coating layers provided on a plurality of optical substrates facing each other with a distance therebetween by adjusting the optical path length between the coating layers; an image acquisition section for acquiring an image of the light transmitted through the tunable spectroscopic element to acquire a spectroscopic image; a storage section (18) for storing information about spectral characteristics corresponding to the wavelength of light transmitted through the tunable spectroscopic element; and an image correction section (21) for correcting the spectroscopic image acquired by the image acquisition section using the information about the spectral characteristics stored in the storage section (18) with respect to each wavelength of light transmitted through the tunable spectroscopic element.

9 Claims, 3 Drawing Sheets

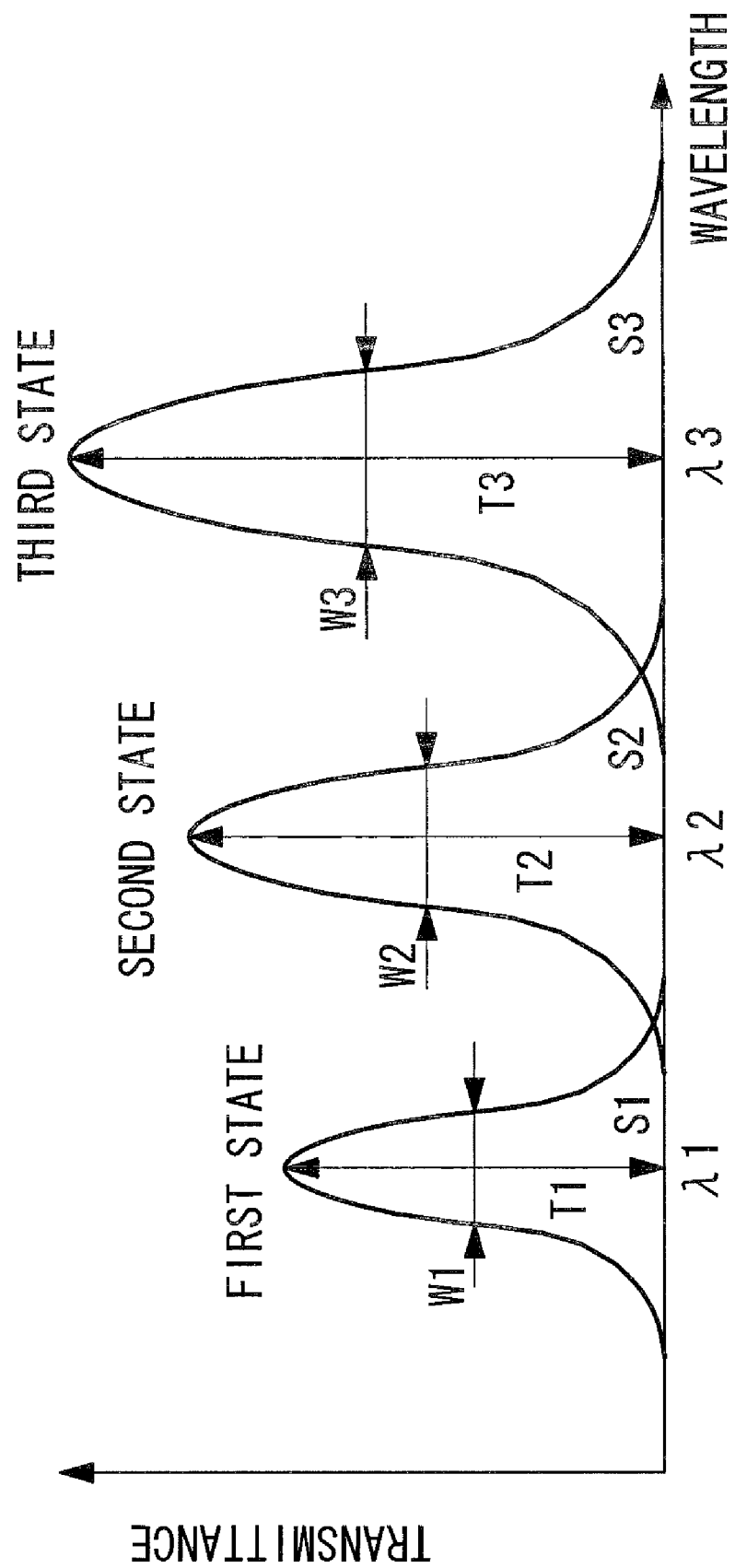

SPECTROSCOPIC DEVICE

TECHNICAL FIELD

The present invention relates to spectroscopic devices.

BACKGROUND ART

An image-acquisition device having an etalon spectroscopic element that can change the transmission band of light by changing the distance between surfaces of a plurality of substrates is known (for example, refer to Patent Document 1).

This image-acquisition device changes the transmission band of light emitted from an image-acquisition object with the etalon spectroscopic element to acquire spectroscopic information of the image-acquisition object. By changing the distance between the surfaces of the two substrates having coating layers, two different transmission characteristics are achieved. By calculating the difference between the intensity distributions of the images, spectrum analysis is performed.
Patent Document 1:
the Publication of Japanese Patent No. 2771785

DISCLOSURE OF INVENTION

However, in the image-acquisition device disclosed in Patent Document 1, the transmission bandwidth of the etalon spectroscopic element is not considered. For example, it has a characteristic that, if coating layers having a uniform transmission-wavelength characteristic is provided, the transmission bandwidth varied by changing the distance between the surfaces of the substrates increases substantially in direct proportion to wavelength in the transmission band.

Therefore, the bandwidth of the spectroscopic information that each image possesses differs among the images acquired in different transmission bands. That is, there is a problem in that, even when an image-acquisition object has spectroscopically uniform intensity, because the transmission bandwidths of the spectroscopic element are different, an image on the long-wavelength side is brighter than an image on the short-wavelength side. Accordingly, there is an inconvenience in that quantitative comparison or calculation of a plurality of images in different transmission bands cannot be performed easily.

The present invention has been made in view of the above-described circumstances, and an object thereof is to provide a spectroscopic device with which quantitative comparison or calculation of a plurality of images in different transmission bands can be easily performed even if the transmission bandwidth of the spectroscopic element is different for each wavelength.

To achieve the above-described object, the present invention provides the following solutions.

The present invention provides a spectroscopic device including: a tunable spectroscopic element that changes the transmission band of light passing through coating layers provided on a plurality of optical substrates facing each other with a distance therebetween by adjusting the optical path length between the coating layers; an image acquisition section for acquiring an image of the light transmitted through the tunable spectroscopic element to acquire a spectroscopic image; a storage section for storing information about spectral characteristics corresponding to the wavelength of light transmitted through the tunable spectroscopic element; and an image correction section for correcting the spectroscopic image acquired by the image acquisition section using the information about the spectral characteristics stored in the storage section with respect to each wavelength of light transmitted through the tunable spectroscopic element.

In the above-described invention, the information about the spectral characteristics may be the transmittance of the tunable spectroscopic element or the proportion of the transmission intensity to the transmission intensity at a predetermined wavelength.

In the above-described invention, the information about the spectral characteristics may be the half width and peak intensity of the spectral characteristics of the tunable spectroscopic element or the proportions of the half width and peak intensity of the spectral characteristics to the half width and peak intensity of the spectral characteristics at a predetermined wavelength.

The above-described invention may further include a distance detecting section for detecting the distance between the coating layers, and the image correction section may extract the information about the spectral characteristics stored in the storage section according to the distance between the coating layers detected by the distance detecting section to correct the spectroscopic image.

The above-described invention may further include actuators for moving the optical substrates in the distance direction, and the image correction section may extract the information about the spectral characteristics stored in the storage section according to an input signal sent to the actuators to correct the spectroscopic image.

In the above-described invention, the storage section may further store sensitivity wavelength characteristics of the image acquisition section, and the image correction section may correct the spectroscopic image according to the sensitivity characteristics of the image acquisition section.

The above-described invention may further include an illumination section for emitting illumination light. The storage section may further store wavelength characteristics of illumination light emitted from the illumination section, and the image correction section may correct the spectroscopic image according to the wavelength characteristics of the illumination light.

In the above-described invention, the image correction section may correct the spectroscopic image acquired by the image acquisition section on a pixel-by-pixel basis.

The above-described invention may further include a calculation section for performing inter-picture processing according to a plurality of spectroscopic images corresponding to different wavelengths corrected by the image correction section.

The present invention provides an advantage in that quantitative comparison or calculation of a plurality of images in different transmission bands can be easily performed even if the transmission bandwidth of the spectroscopic element is different at different wavelengths.

BRIEF DESCRIPTION OF DRAWINGS

FIG. 4 is a graph showing the spectral characteristics of the tunable spectroscopic element in FIG. 3.

EXPLANATION OF REFERENCE SIGNS

1: endoscope system (spectroscopic device)
4: light source unit (illumination section)
10: tunable spectroscopic element
11: image acquisition element (image acquisition section)
12a, 12b: reflective film (coating layer)
13a, 13b: optical substrate
14: actuator
15a, 15b: capacitance sensor electrode (distance detecting section)
18: storage section
21: second image-processing circuit (image correction section)
$\lambda 1$, $\lambda 2$, $\lambda 3$: wavelength
T1, T2, T3: peak intensity
W1, W2, W3: full width at half maximum (half width)
S1, S2, S3: transmission intensity

BEST MODE FOR CARRYING OUT THE INVENTION

An endoscope system (spectroscopic device) 1 according to a first embodiment of the present invention will be described below with reference to FIGS. 1 to 4.

Figure 1:
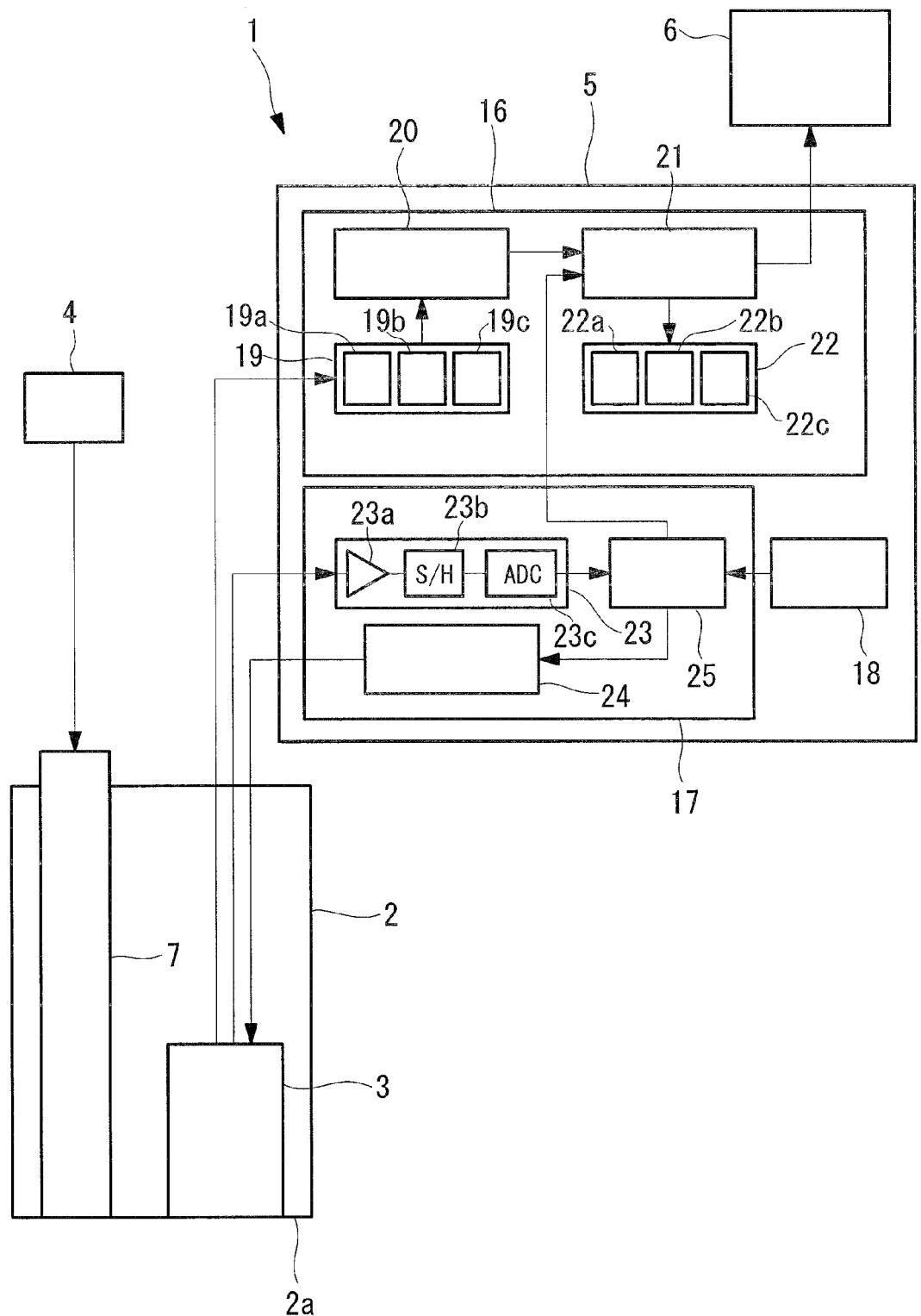
FIG. 1 is a block diagram showing the overall structure of an endoscope system according to an embodiment of the present invention.

As shown in FIG. 1, an endoscope system 1 according to this embodiment includes an insertion portion 2 to be inserted in the body cavity of a living body, an image acquisition unit 3 to be disposed in the insertion portion 2, a light source unit 4 that emits illumination light, a control unit 5 that controls the image acquisition unit 3, and a display unit 6 that displays an image acquired by the image acquisition unit 3.

The insertion portion 2 has an extremely thin external dimension that allows insertion into the body cavity of a living body. The insertion portion 2 includes therein the image acquisition unit 3 and a light guide 7 for propagating light from the light source unit 4 to a tip 2a.

The light source unit 4 includes an illumination-light light source (not shown) that emits illumination light for illuminating an object to be observed in the body cavity to acquire reflected light reflected at and returned from the object to be observed, and a light source control circuit for controlling the illumination-light light source.

The illumination-light light source is formed by combining, for example, a xenon lamp and a band-pass filter (not shown). The 50% transmission band of the band-pass filter used in the illumination light source is set to a wavelength band including transmission wavelength bands $\lambda 1$ to $\lambda 3$ of a tunable spectroscopic element described below. That is, the light source unit 4 emits illumination light in a wavelength band including the wavelength bands $\lambda 1$ to $\lambda 3$.

Figure 2:
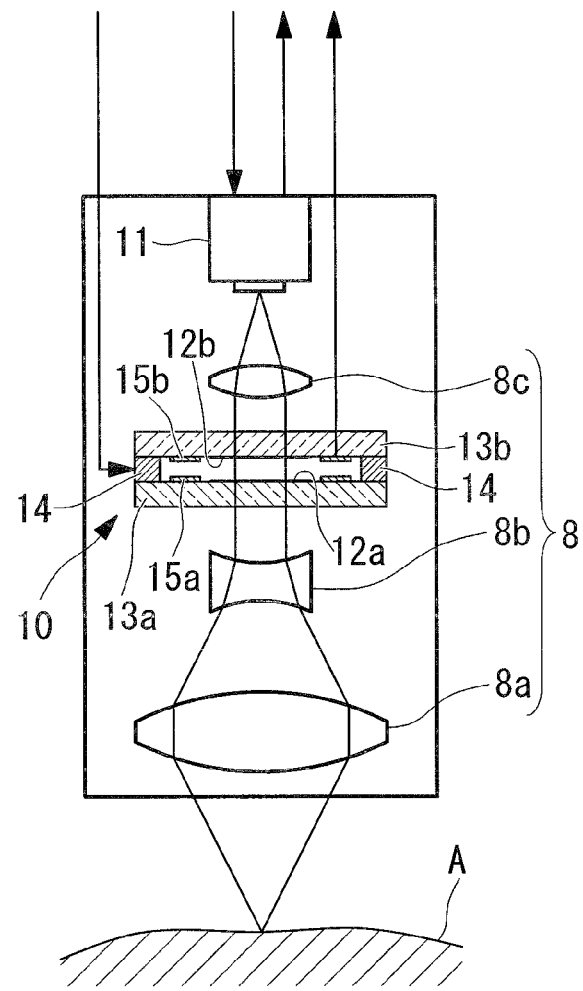
FIG. 2 is a schematic diagram showing the internal structure of an image acquisition unit of the endoscope system in FIG. 1.

As shown in FIG. 2, the image acquisition unit 3 includes an image-acquisition optical system 8 consisting of three lenses 8a, 8b, and 8c, for focusing light incident from an object to be observed A, a tunable spectroscopic element 10 that can change its spectral characteristics by the operation of the control unit 5, and an image acquisition element 11, such as a CCD, that acquires an image of the light focused by the image-acquisition optical system 8 and converts it into an electrical signal.

Figure 3:
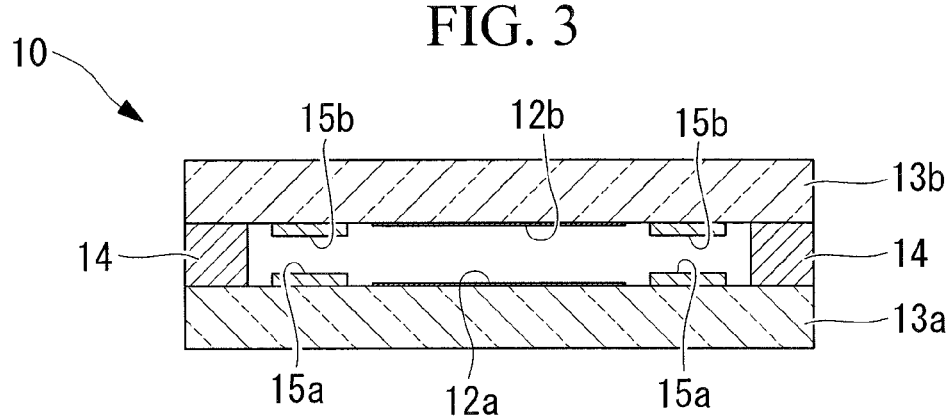
FIG. 3 is a longitudinal sectional view showing an example of a tunable spectroscopic element provided in the image acquisition unit in FIG. 2.

As shown in FIG. 3, the tunable spectroscopic element 10 is an etalon-type optical filter including two plate-like optical members 13a and 13b that are disposed in parallel with a certain distance therebetween and have reflective films (coating layers) 12a and 12b in areas of the optically effective diameter of the opposed surfaces, and actuators 14 that change the distance between the optical members 13a and 13b.

The actuators 14 are columnar members made of, for example, piezoelectric elements. The actuators 14 are arranged at, for example, four locations around the circumferential direction of the optical members 13a and 13b at intervals and expand or contract in length in response to a driving signal.

The tunable spectroscopic element 10 can change the wavelength band of light transmitted therethrough by changing the distance between the optical members 13a and 13b by activating the actuators 14.

The distance between the optical members 13a and 13b is set to an extremely small value, for example, micron-order or less.

Capacitance sensor electrodes 15a and 15b are disposed outside the optically effective diameter, at positions corresponding to the actuators 14.

The reflective films 12a and 12b are formed of, for example, a dielectric multilayer film.

The capacitance sensor electrodes 15a and 15b are formed of a metal film.

As shown in FIG. 4, in this embodiment, the tunable wavelength band of the tunable spectroscopic element 10 can be changed into three states in response to control signals from the control unit 5.

In a first state, light in a band with a peak wavelength of $\lambda 1$ and a full width at half maximum of W1 is transmitted. The transmission intensity at this time is S1. In a second state, light in a band with a peak wavelength of $\lambda 2$ ($\lambda 2 > \lambda 1$) and a full width at half maximum of W2 is transmitted. The transmission intensity at this time is S2. In a third state, light in a band with a peak wavelength of $\lambda 3$ ($\lambda 3 > \lambda 2$) and a full width at half maximum of W3 is transmitted. The transmission intensity at this time is S3. The relationship between the full widths at half maximum W1, W2, and W3 and the relationship between the transmission intensities S1, S2, and S3 of light transmitted through the tunable spectroscopic element 1 in the aforementioned states are W1<W2<W3 and S1<S2<S3, respectively.

As shown in FIG. 1, the control unit 5 includes an image-processing section 16 for processing image information acquired by the image acquisition element 11, a tunable-spectroscopic-element control circuit 17 for driving and controlling the tunable spectroscopic element 10, and a storage section 18 for storing information about the spectral characteristics of the respective wavelengths.

The image-processing section includes a first frame memory 19 for storing the image information acquired by the image acquisition element 11, a first image-processing circuit 20 for processing the image information stored in the first frame memory 19, a second image-processing circuit (image correction section) 21 for correcting and processing the image information processed by the first image-processing circuit 20 using the information about the spectral characteristics stored in the storage section 18, and a second frame memory 22 for storing the image information corrected and processed by the second image-processing circuit 21.

The tunable-spectroscopic-element control circuit 17 includes a signal processing section 23 for processing a signal from the capacitance sensor electrodes 15a and 15b of the tunable spectroscopic element 10 and an actuator control section 24 that feedback-controls the actuators 14 using the processed signal. The signal processing section 23 includes, for example, an amplifier 23a for amplifying the signal from the capacitance sensor electrodes 15a and 15b, a sample-and-hold circuit 23b, and an A/D converter 23c.

The tunable-spectroscopic-element control circuit 17 has a compensator 25. The compensator 25 is configured to extract the information about the spectral characteristics in the storage section 18 using the signal from the capacitance sensor electrodes 15a and 15b processed by the signal processing section 23 and to send the extracted information about the spectral characteristics to the second image-processing circuit 21.

An example of the information about the spectral characteristics in the storage section 18 is the proportions of the transmission intensities stored corresponding to the wavelengths. For example, S1/S1=1 is stored corresponding to the wavelength $\lambda 1$, S1/S2 is stored corresponding to the wavelength $\lambda 2$, and S1/S3 is stored corresponding to the wavelength $\lambda 3$.

The compensator 25 calculates the distance between the coating layers 12a and 12b on the basis of the signal from the capacitance sensor electrodes 15a and 15b. Thus, the wavelength of light transmitted through the tunable spectroscopic element 10 is determined according to the distance. The compensator 25 extracts from the storage section 18 the proportion of the transmission intensity S1, S2, or S3 that corresponds to the thus-determined wavelength of light transmitted through the tunable spectroscopic element 10.

The first frame memory 19 and the second frame memory 22 include first, second, and third memories 19a, 19b, and 19c and first, second, and third memories 22a, 22b, and 22c, respectively, for storing image information corresponding to the respective wavelength bands.

When the tunable-spectroscopic-element control circuit 17 turns the tunable spectroscopic element 10 to the first state, the image acquisition element 11 outputs image information to the first memory 19a. When the tunable-spectroscopic-element control circuit 17 turns the tunable spectroscopic element 10 to the second state, the image acquisition element 11 outputs image information to the second memory 19b. Furthermore, When the tunable-spectroscopic-element control circuit 17 turns the tunable spectroscopic element 10 to the third state, the image acquisition element 11 outputs image information to the third memory 19c.

For example, the first image-processing circuit 20 receives image information in the $\lambda 1$ band from the first memory 19a, image information in the $\lambda 2$ band from the second memory 19b, and image information in the $\lambda 3$ band from the third memory 19c. The first image-processing circuit 20 performs predetermined image processing on the thus-received pieces of image information and outputs them to the second image-processing circuit 21.

The second image-processing circuit 21 multiplies the image information processed by the first image-processing circuit 20 by the proportions of the transmission intensities S1 to S3 sent from the compensator 25 on a pixel-by-pixel basis. This normalizes the difference in brightness among the images caused by the difference in the transmission intensities S1 to S3 of the respective wavelengths through the tunable spectroscopic element 10 and performs correction such that the transmission intensities S1 to S3 become equal image information regardless of the wavelength.

The pieces of image information corrected by the second image-processing circuit 21 are stored in the corresponding first to third memories 22a to 22c in the second frame memory 22 and are output to the display unit 6.

The operation of the thus-configured endoscope system 1 according to this embodiment will be described below.

To acquire an image of an image-acquisition object A in the body cavity of a living body using the endoscope system 1 according to this embodiment, the insertion portion 2 is inserted in the body cavity and the tip 2a thereof is made to face the image-acquisition object A in the body cavity. In this state, the light source unit 4 and the control unit 5 are activated to cause the light source unit 4 to emit illumination light.

The illumination light generated at the light source unit 4 propagates through the light guide 7 to the tip 3a, of the insertion portion 3 and is emitted from the tip 3a of the insertion portion 3 toward the image-acquisition object A.

The illumination light is reflected at the surface of the image-acquisition object A. The reflected light is focused by the image-acquisition optical system 8 and is transmitted through the tunable spectroscopic element 10. Then, an image is formed on the image acquisition element 11. Thus, reflected-light image information is acquired.

To acquire a reflected-light image in a band including the wavelength $\lambda 1$, the tunable-spectroscopic-element control circuit 17 is activated to turn the tunable spectroscopic element 10 to the first state. This sets the band of the reflected light reaching the image acquisition element 11 to a band including the wavelength $\lambda 1$ with a full width at half maximum of W1 (at this time, the transmission intensity of reflected light is S1, and the peak light intensity is T1). The reflected-light image information acquired by the image acquisition element 11 is stored in the first memory 19a.

To acquire a reflected-light image in a band including the wavelength $\lambda 2$, the tunable-spectroscopic-element control circuit 17 is activated to turn the tunable spectroscopic element 10 to the second state. This sets the band of the reflected light reaching the image acquisition element 11 to a band including the wavelength $\lambda 2$ with a full width at half maximum of W2 (at this time, the transmission intensity of reflected light is S2, and the peak light intensity is T2). The reflected-light image information in the green band acquired by the image acquisition element 11 is stored in the second memory 19b.

To acquire a reflected-light image in a band including the wavelength $\lambda 3$, the tunable-spectroscopic-element control circuit 17 is activated to turn the tunable spectroscopic element 10 to the third state. This sets the band of the reflected light reaching the image acquisition element 11 to a band including the wavelength $\lambda 3$ with a full width at half maximum of W3 (at this time, the transmission intensity of reflected light is S3, and the peak light intensity is T3). The reflected-light image information in the green band acquired by the image acquisition element 11 is stored in the third memory 19c.

As has been described, the endoscope system 1 according to this embodiment enables light reflected from the object to be observed A to be separated according to the respective wavelength bands.

In this case, in the endoscope system 1 according to this embodiment, the reflected-light image information stored in the first frame memory 19 is subjected to predetermined processing by the first image-processing circuit 20. The thus-processed pieces of reflected-light image information are normalized by being multiplied by the proportions of the transmission intensities in the second image-processing circuit 21 and are then stored in the second frame memory 22 and displayed on the display unit 6.

Thus, the endoscope system 1 according to this embodiment can prevent the occurrence of a problem in that the brightness of the reflected-light image in a long-wavelength band is higher than that of the reflected-light image information in another wavelength band.

The endoscope system 1 according to this embodiment provides an advantage in that, by using the image information stored in the second frame memory 22 in a state in which the difference in transmission intensities corresponding to the wavelength bands is corrected, superimposed display using reflected-light image information in a plurality of wavelength bands or inter-picture processing can be easily performed without complex correction processing.

The endoscope system 1 according to this embodiment may be transformed or modified as follows.

First, in the above-described endoscope system 1 according to this embodiment, the proportions 1, S1/S2, and S1/S3, of the transmission intensities S1, S2, and S3 corresponding to the wavelength bands $\lambda 1$, $\lambda 2$, and $\lambda 3$ are stored in the storage section 18. However, instead of this, the transmission intensities S1, S2, and S3 may be stored, and the proportions of these transmission intensities may be calculated in the second image-processing circuit 21.

Alternatively, instead of the proportions of the transmission intensities S1, S2, and S3, the proportions of the full widths at half maximum W1, W2, and W3 and of the peak light intensities T1, T2, and T3 corresponding to the wavelength bands $\lambda 1$, $\lambda 2$, and $\lambda 3$ may be stored, and the proportions of the transmission intensities S1, S2, and S3 may be calculated according to the stored proportions.

Furthermore, the storage section 18 may store not only the spectral characteristics of the tunable spectroscopic element 10, but also the sensitivity characteristics of the image acquisition element 11. In this case, by correcting the image information in the wavelength bands $\lambda 1$, S2, and $\lambda 3$ in the second image-processing circuit 21 using the sensitivity characteristics of the image acquisition element 11 extracted from the storage section 18, even if the sensitivity of the image acquisition element 11 fluctuates among the bands, such fluctuations can be eliminated and a spectroscopic image equal to that acquired by the image acquisition element 11 having uniform sensitivity can be acquired.

In addition, the storage section 18 may store the spectral characteristics of the light source unit 4. In this case too, similarly to the above-described case, by correcting the image information in the wavelength bands $\lambda 1$, $\lambda 2$, and $\lambda 3$ in the second image-processing circuit 21 using the spectral characteristics of the light source unit 4 extracted from the storage section 18, even if the spectral characteristics of the light source unit 4 fluctuate among the bands, such fluctuations can be eliminated and a spectroscopic image equal to that acquired by illuminating with constantly uniform illumination light can be acquired. Because the spectral characteristics of the light source unit 4 fluctuate according to the state of the light source, for example, the operating time and the temperature, a plurality of spectral characteristics for each parameter may be stored and a suitable one may be used.

The endoscope system 1 of the present invention may be applied to either a flexible scope or a rigid borescope. Furthermore, the present invention is not limited to the endoscope system 1, but may be applied to other spectroscopic devices. In the above-described embodiment, (reflection or diffusion) endoscope images in the respective wavelength bands are acquired using light from a xenon lamp that has a relatively broad band spectrum (including wavelength bands $\lambda 1$, $\lambda 2$, and $\lambda 3$) as a light source. However, the present invention may employ a laser for generating an excitation light beam that has a relatively narrow band for exciting fluorescence in the wavelength band $\lambda 1$, $\lambda 2$, or $\lambda 3$ as a light source to acquire a fluorescent endoscope image. More specifically, in the present invention, it is possible that excitation light beams having a plurality of different wavelengths included in bands other than the wavelength bands $\lambda 1$, $\lambda 2$, and $\lambda 3$ are incident in a time-shared manner, and fluorescence corresponding to the plurality of excitation light beams (fluorescent images in at least two of the wavelength bands $\lambda 1$, $\lambda 2$, and $\lambda 3$) is acquired to perform inter-picture processing using these fluorescent endoscope images to obtain a desired image.

The invention claimed is:

1. A spectroscopic device comprising:
   a tunable spectroscopic element that changes the transmission band of light passing through coating layers provided on a plurality of optical substrates facing each other with a distance therebetween by adjusting the optical path length between the coating layers;
   an image acquisition section for acquiring an image of the light transmitted through the tunable spectroscopic element to acquire a spectroscopic image;
   a storage section for storing information about spectral characteristics corresponding to the wavelength of light transmitted through the tunable spectroscopic element; and
   an image correction section for correcting the spectroscopic image acquired by the image acquisition section using the information about the spectral characteristics stored in the storage section with respect to each wavelength of light transmitted through the tunable spectroscopic element.

2. The spectroscopic device according to claim 1,
   wherein the information about the spectral characteristics is the transmittance of the tunable spectroscopic element or the proportion of the transmission intensity to the transmission intensity at a predetermined wavelength.

3. The spectroscopic device according to claim 1,
   wherein the information about the spectral characteristics is the half width and peak intensity of the spectral characteristics of the tunable spectroscopic element or the proportions of the half width and peak intensity of the spectral characteristics to the half width and peak intensity of the spectral characteristics at a predetermined wavelength.

4. The spectroscopic device according to claim 1, further comprising a distance detecting section for detecting the distance between the coating layers;
   wherein the image correction section extracts the information about the spectral characteristics stored in the storage section according to the distance between the coating layers detected by the distance detecting section to correct the spectroscopic image.

5. The spectroscopic device according to claim 1, further comprising actuators for moving the optical substrates in the distance direction,
   wherein the image correction section extracts the information about the spectral characteristics stored in the storage section according to an input signal sent to the actuators to correct the spectroscopic image.

6. The spectroscopic device according to claim 1,
   wherein the storage section further stores sensitivity wavelength characteristics of the image acquisition section, and
   wherein the image correction section corrects the spectroscopic image according to the sensitivity characteristics of the image acquisition section.

7. The spectroscopic device according to claim 1, further comprising an illumination section for emitting illumination light,
   wherein the storage section further stores wavelength characteristics of illumination light emitted from the illumination section, and wherein the image correction section corrects the spectroscopic image according to the wavelength characteristics of the illumination light.

8. The spectroscopic device according to claim 1, wherein the image correction section corrects the spectroscopic image acquired by the image acquisition section on a pixel-by-pixel basis.

9. The spectroscopic device according to claim 1, further comprising a calculation section for performing inter-picture processing according to a plurality of spectroscopic images corresponding to different wavelengths corrected by the image correction section.

* * * * *